US012705584B2

(12) United States Patent
Kim

(10) Patent No.: US 12,705,584 B2
(45) Date of Patent: Aug. 11, 2026

(54) SERVER, METHOD, AND PROGRAM FOR MEASURING WASTE DISCHARGE AMOUNT AND MANAGING WASTE COLLECTION

(71) Applicant: NUVI LABS CO., LTD., Incheon (KR)

(72) Inventor: Dae Hoon Kim, Seoul (KR)

(73) Assignee: NUVI LABS CO., LTD., Incheon (KR)

(*) Notice: Subject to any disclaimer, the term of this patent is extended or adjusted under 35 U.S.C. 154(b) by 522 days.

(21) Appl. No.: 18/265,237

(22) PCT Filed: Mar. 2, 2021

(86) PCT No.: PCT/KR2021/002571

§ 371 (c)(1),
(2) Date: Jun. 2, 2023

(87) PCT Pub. No.: WO2022/119052

PCT Pub. Date: Jun. 9, 2022

(65) Prior Publication Data

US 2024/0104517 A1 Mar. 28, 2024

(30) Foreign Application Priority Data

Dec. 4, 2020 (KR) ........................ 10-2020-0168539
Dec. 7, 2020 (KR) ........................ 10-2020-0169982

(51) Int. Cl.
*G06Q 30/00* (2023.01)
*B65F 1/14* (2006.01)
(Continued)

(52) U.S. Cl.
CPC ............... *G06Q 10/30* (2013.01); *B65F 1/14* (2013.01); *G06Q 50/26* (2013.01);
(Continued)

(58) Field of Classification Search
CPC ........ G06Q 10/30; G06Q 50/26; G06Q 50/10; G06Q 30/04; B65F 1/14; B65F 1/02;
(Continued)

(56) References Cited

U.S. PATENT DOCUMENTS 10,035,647 B1 * 7/2018 Rodoni ................. B65F 1/1484
11,524,842 B2 * 12/2022 Sridhar ............... G06F 16/9035
(Continued)

FOREIGN PATENT DOCUMENTS

JP 2009031945 A 2/2009
JP 2020101899 A 7/2020
(Continued)

OTHER PUBLICATIONS

Vicentini, Federico, et al. "Sensorized waste collection container for content estimation and collection optimization." Waste management 29.5 (2009): 1467-1472. (Year: 2009).*
(Continued)

*Primary Examiner* — Luis A Brown
(74) *Attorney, Agent, or Firm* — Maschoff Brennan

(57) ABSTRACT

The present invention relates to a server for measuring a waste discharge amount and managing waste collection, the server calculating, on the basis of image data of a waste collection box captured by a sensor, the volume of waste discharged to the waste collection box, using the calculated volume to update the volume of waste accumulated in the waste collection box, and recording that the waste in the waste collection box has been collected by a waste collection company if a collection signal of the waste collection box is received from a terminal of the waste collection company, and thus the waste of all affiliated companies can be continuously tracked and monitored.

14 Claims, 7 Drawing Sheets

(51) Int. Cl.
*G06Q 10/30* (2023.01)
*G06Q 50/26* (2012.01)

(52) U.S. Cl.
CPC ... *B65F 2210/128* (2013.01); *B65F 2210/138* (2013.01); *B65F 2210/168* (2013.01); *B65F 2210/182* (2013.01); *B65F 2210/184* (2013.01)

(58) Field of Classification Search
CPC .......... B65F 2210/138; B65F 2210/168; B65F 2210/182; B65F 2210/184; B65F 2210/1443; B65F 2210/152; Y02W 30/10
See application file for complete search history.

(56) References Cited

U.S. PATENT DOCUMENTS

2012/0010746 A1* 1/2012 Sundholm .............. G06Q 10/08 700/226
2012/0330850 A1* 12/2012 Di Giugno ............ G01F 23/265 705/308
2014/0172174 A1* 6/2014 Poss ....................... G05B 15/02 700/275
2014/0279577 A1* 9/2014 Deering ................. G06Q 10/30 705/308
2015/0144012 A1* 5/2015 Frybarger .......... G06Q 30/0207 705/14.1
2015/0307273 A1* 10/2015 Lyman .................. B65F 1/1615 705/26.61
2015/0323366 A1* 11/2015 Kekalainen ............. G01F 17/00 702/188
2015/0324760 A1* 11/2015 Borowski ............. B65F 1/0006 705/308
2016/0321619 A1* 11/2016 Inan ........................ H04L 69/40
2016/0379152 A1* 12/2016 Rodoni .............. G01C 21/3476 705/7.15
2017/0243363 A1* 8/2017 Rodoni ..................... G06T 7/90
2019/0210798 A1* 7/2019 Schultz .................. G01G 19/08
2020/0010271 A1* 1/2020 Bourn .................... G06V 10/82
2020/0034785 A1* 1/2020 Romano ............ G06Q 10/0832
2020/0191580 A1* 6/2020 Christensen ......... G01C 21/343
2021/0188541 A1* 6/2021 Kurani ................... G06Q 10/08
2021/0272073 A1* 9/2021 Chen ....................... G06F 18/21
2022/0396424 A1* 12/2022 Gwon ..................... H04L 67/12
2024/0092567 A1* 3/2024 Subramaniam ........... B65F 1/14

FOREIGN PATENT DOCUMENTS

JP 2020194213 A 12/2020
KR 20100013461 A 2/2010
KR 20100092854 A 8/2010
KR 101019286 B1 3/2011
KR 101954399 B1 3/2019
KR 102014648 B1 8/2019

OTHER PUBLICATIONS

Rovetta, Alberto, et al. "Early detection and evaluation of waste through sensorized containers for a collection monitoring application." Waste Management 29.12 (2009): 2939-2949. (Year: 2009).*
Bobulski, Janusz, and Mariusz Kubanek. "Waste classification system using image processing and convolutional neural networks." International work-conference on artificial neural networks. Cham: Springer International Publishing, 2019. (Year: 2019).*
Hannan, M. A., et al. "Content-based image retrieval system for solid waste bin level detection and performance evaluation." Waste management 50 (2016): 10-19. (Year: 2016).*
KR Office Action in Application No. 10-2020-0169982 dated Jan. 19, 2022.

* cited by examiner

FIG. 5

| | Status of a waste collection box | Volume of collected waste | Weight of collected waste | Location information | |
|---|---|---|---|---|---|
| Affiliated company #1 | 30/100 | | | | Collection bid |
| Affiliated company #2 | 70/100 | | | | Collection bid |
| Affiliated company #3 | 80/100 | | | | Collection bid |
| Affiliated company #4 | 20/100 | | | | Collection bid |
| • • • | | | | | |

FIG. 7

| | Affiliated company #1 | Affiliated company #2 | Affiliated company #3 | Affiliated company #4 | ... |
|---|---|---|---|---|---|
| Type of collected waste | | | | | |
| Weight of collected waste | | | | | |
| Cost burden of affiliated company | | | | | |
| Compensation amount of affiliated company | | | | | |

SERVER, METHOD, AND PROGRAM FOR MEASURING WASTE DISCHARGE AMOUNT AND MANAGING WASTE COLLECTION

CROSS-REFERENCE TO RELATED APPLICATIONS

This application is the National Stage filing under 35 U.S.C. 371 of International Application No. PCT/KR2021/002571, filed on Mar. 2, 2021, which claims the benefit of Korean Patent Application No. 10-2020-0168539 filed on Dec. 4, 2020, and Korean Patent Application No. 10-2020-0169982 filed on Dec. 7, 2020, the contents of which are all hereby incorporated by reference herein in their entirety.

TECHNICAL FIELD

The present disclosure relates to a server, method, and program for measuring a waste discharge amount and managing collection of waste collected by a collection company.

BACKGROUND ART

In general, a lot of waste is generated in places where many people live and are active, such as restaurants, convenience stores, catering establishments, apartment complexes, corporations, public institutions, military bases, and schools, the generated waste is collected in a collection box, and a collection company collects the collection box at regular intervals and transports the collection box to a waste dump.

Since the amount of waste generated is not constant, sometimes the amount of waste generated is so large that the collection box is full before the collection company collects the waste.

In addition, since a device for accurately measuring the amount of waste collected by the collection company is not used, there is a problem in that the amount of waste collected by the collection company is not accurately managed.

Moreover, taking the fact that tracking of the waste does not work well after the collection company collects the waste from the collection box, in some cases, the collection company does not discard the waste in a designated waste dump, but discard the waste in a place such as a mountain or an empty lot without permission.

As such, since a process of collecting the waste collection and discarding the waste is not managed by data, it is difficult to implement a data-based efficient waste reduction policy. Moreover, since the waste treatment process is not transparent, the issue of disproportionate treatment costs is also emerging.

Therefore, there is an urgent need for a system that accurately measures the amount of waste discharged and manages the collection of waste using the measurement.

DISCLOSURE

Technical Problem

In order to solve the above problems, in the present disclosure, a volume of waste discarded in the collection box is calculated based on an image of a waste collection box photographed by a sensor, and the volume of waste accumulated in the collection box is updated using the calculated volume.

In addition, in the present disclosure, when a collection signal of the collection box is received from a terminal of the waste collection company, it is record that the waste of the collection box is collected by the corresponding collection company.

In addition, in the present disclosure, the movement path of the collection company is tracked until the waste collected by the collection company is discarded in the dump by using GPS information of the waste collection company terminal.

In addition, in the present disclosure, an error is measured by comparing a discard measurement value received from a sensor installed in the dump and sensing the discarded waste with a total amount of collection.

The problems to be solved by the present disclosure are not limited to the problems mentioned above, and other problems not mentioned will be clearly understood by those skilled in the art from the description below.

Technical Solution

In order to solve the above-described problems, according to one embodiment of the present embodiment, there is provided a server for measuring a waste discharge amount and managing waste collection, the server including: a communication unit that receives photographing data taken by a first sensor installed in a location for photographing at least one waste collection box to photograph waste discarded in the waste collection box; and a processor that calculates a volume of the waste discarded in the waste collection box based on the received photographing data, updates the volume of waste accumulated in the waste collection box based on the calculated waste volume, and records in a memory that the waste in the collection box is collected by the waste collection company when a collection signal of the waste collection company is received from a terminal of a specified waste collection company, wherein the processor determines a type of the waste discarded in the waste collection box based on the image data included in the received photographing data, and calculates a volume and weight of the waste discarded in the waste collection box based on the determined waste type and depth data included in the received photographing data.

Moreover, when the type of waste discarded in the waste collection box is determined, wherein the processor calculates the weight of the waste in the waste collection box based on the calculated volume value and the previously stored density value of the corresponding waste.

Moreover, the processor may determine a type of the waste discarded in the waste collection box based on the image data included in the received photographing data, and calculate a volume and weight of the waste discarded in the waste collection box based on the determined waste type and depth data included in the received photographing data.

The processor may specify the collection company that collects the waste collection box based on identification information of the collection company received in a process of collecting the waste collection box.

Moreover, the processor may acquire GPS information of a collection company terminal of the collection company from a time when the collection signal is received and track the location of the collection company terminal until receiving the discard completion signal from the collection company terminal using the acquired GPS information, and record in a memory that the discard of the waste of the affiliated company is completed in a dump when the discard completion signal is received from the terminal of the collection company collecting the waste of the collection box.

The processor may combine weight of waste in the waste collection box collected from the collection company and record the combined weight as a total amount of collection, and compare the total amount of collection and a discard measurement value to measure an error when receiving the discard measurement value including the weight of the waste discarded by the collection company from a second sensor which is installed in the dump to sense the discarded waste.

In addition, when the error exceeds a preset error range, the processor may calculate possible reduction according to waste transport based on movement path information from the collection company terminal to the dump and the type of waste collected by the collection company, and determine justification of occurrence of the error based on the possible reduction.

The server may further include a payment module for calculating a cost burden of the affiliated company and a compensation amount of the collection company according to the type and amount of the waste, in which when the justification of the error occurrence passes, the processor may control the payment module to calculate the cost burden of the affiliated company and the compensation amount of the collection company based on the type and weight of the waste.

The processor may generate movement path information of the collection company terminal based on location information of at least one waste collection box scheduled to be collected by the collection company and location information of the dump in which the waste collected by the collection company is scheduled to be discarded, and when the terminal of the collection company is out of a preset range in the movement path, the collection company terminal is turned off, or a GPS function of the collection company terminal is turned off while the location of the collection company terminal is tracked, the processor may record location information of the collection company terminal and time information at the corresponding time point and provide warning to the collection company terminal.

The processor may provide information on a waste volume accumulated in at least one waste collection box assigned to the at least one affiliated company to the terminal of the waste collection company connected to the server, calculate an expected collection time of the waste collection box of the specified affiliated company based on current location information and collection route information of at least one collection company that bids on the waste collection of the specified affiliated company, examine based on the calculated expected collection time and the waste volume accumulated in the waste collection box to select one collection company among the collection companies that made the bid, and then provide a collection right of the waste collection box to the selected collection company.

Updating the volume of the waste accumulated in the waste collection box may be executed every time the waste in the waste collection box is discarded or at a fixed time point.

Moreover, raw data of the waste collection box includes capacity information or size information of the waste collection box, and wherein the size information includes size information or width information of the cross section of the waste collection box, and depth information of the waste collection box.

Moreover, the processor checks the characteristic value of a company where the waste collection box exists by using the location information of the waste collection box, and determines the type of discarded garbage using the checked characteristic value of the company.

Moreover, the processor identifies a characteristic value of the affiliated company by using location information of the waste collection box located in the affiliated company, and determines the type of discarded waste using the identified characteristic value of the affiliated company.

In order to solve the above-described problems, according to another embodiment of the present disclosure, there is provided a method for measuring a waste discharge amount and managing waste collection executed by a computer, the method including: receiving photographing data taken by a first sensor installed in a location for photographing at least one waste collection box to photograph waste discarded in the waste collection box; calculating a volume of the waste discarded in the waste collection box based on the received photographing data; updating the volume of waste accumulated in the waste collection box based on the calculated waste volume; and recording in a memory that the waste in the collection box is collected by a specified waste collection company when a collection signal of the waste collection box is received from a terminal of the specified waste collection company, wherein the calculating the volume of the waste determines a type of the waste discarded in the waste collection box based on the image data included in the received photographing data, and calculates a volume and weight of the waste discarded in the waste collection box based on the determined waste type and depth data included in the received photographing data.

The computer may acquire GPS information of a collection company terminal of the collection company from a time when the collection signal is received and track the location of the collection company terminal until receiving the discard completion signal from the collection company terminal using the acquired GPS information, and record in a memory that the discard of the waste of the affiliated company is completed in a dump when the discard completion signal is received from the terminal of the collection company collecting the waste of the collection box.

The computer may combine weight of waste in the waste collection box collected from the collection company and record the combined weight as a total amount of collection, and compare the total amount of collection and a discard measurement value to measure an error when receiving the discard measurement value including the weight of the waste discarded by the collection company from a second sensor which is installed in the dump to sense the discarded waste.

When the error exceeds a preset error range, the computer may calculate possible reduction according to waste transport based on movement path information from the collection company terminal to the dump and the type of waste collected by the collection company, and determine justification of occurrence of the error based on the possible reduction.

In addition to this, another method for implementing the present disclosure, another system, and a computer readable recording medium recording a computer program for executing the method may be further provided.

Advantageous Effects

According to the present disclosure as described above, the volume of the waste discarded in the collection box is calculated based on the image of the waste collection box photographed by the sensor, and the volume of the waste accumulated in the collection box is updated using the calculated volume. Therefore, it is possible to request collection before the amount of waste in the collection box becomes excessive.

In addition, according to the present disclosure, when the collection signal of the collection box is received from the terminal of the waste collection company, it is record that the waste of the collection box is collected by the corresponding collection company. Therefore, it is possible to continuously track and monitor the waste of all affiliated companies.

In addition, according to the present disclosure, the movement path of the collection company is tracked until the waste collected by the collection company is discarded in the dump by using GPS information of the waste collection company terminal. Therefore, it is possible to prevent waste from being discarded in an arbitrary place without permission.

In addition, according to the present disclosure, an error is measured by comparing the discard measurement value received from the sensor installed in the dump with a total amount of collection. Therefore, it is possible to block illegal activities such as dumping collected waste in an arbitrary place.

The effects of the present disclosure are not limited to the effects mentioned above, and other effects not mentioned will be clearly understood by those skilled in the art from the description below.

DESCRIPTION OF DRAWINGS

FIG. 5 is a diagram illustrating that a processor posts a volume status of a waste collection box and receives a collection bid from a collection company.

FIG. 7 is a diagram illustrating that a payment module calculates a cost burden of an affiliated company and a collection compensation amount of a collection company based on the type and weight of waste.

MODE FOR DISCLOSURE

Figure 1:
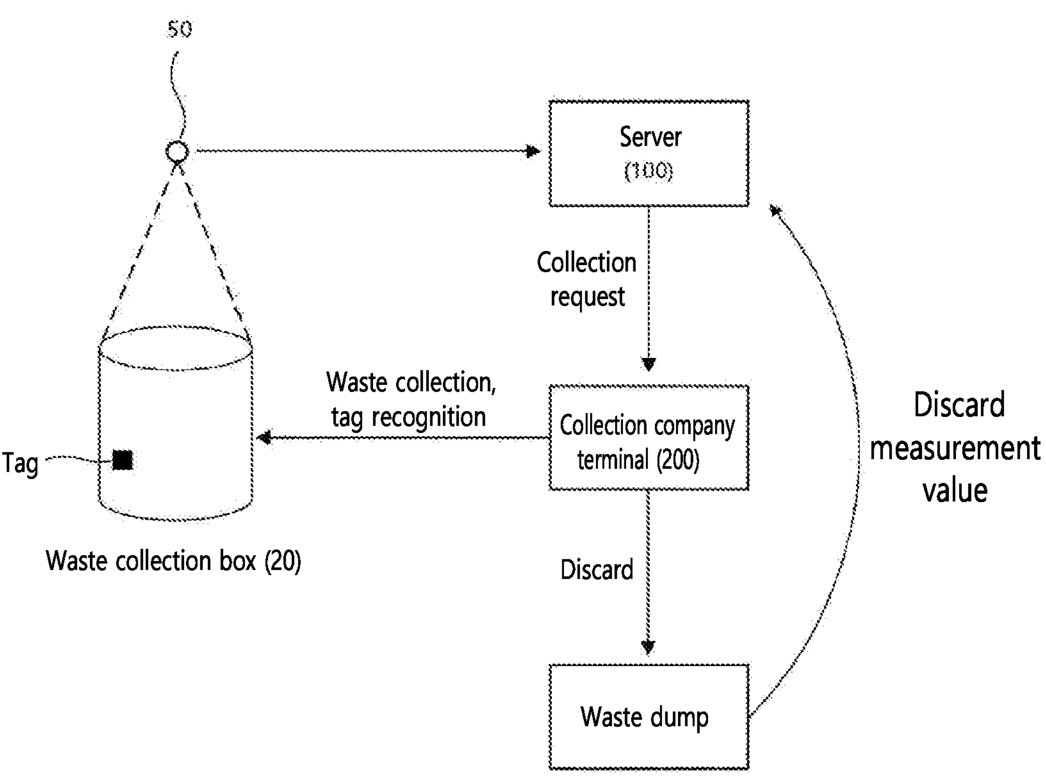
FIG. 1 is a schematic diagram of a system for measuring a waste discharge amount and collecting waste according to one embodiment of the present disclosure.

Advantages and features of the present disclosure, and methods of achieving them, will become clear with reference to the detailed description of the following embodiments taken in conjunction with the accompanying drawings. However, the present disclosure is not limited to the embodiments disclosed below, but may be implemented in various different forms. Moreover, these embodiments are provided only to make the disclosure of the present invention complete, and to fully inform those skilled in the art of the scope of the present invention to which the present invention belongs, and the present invention is only defined by the scope of the claims.

Terminology used herein is for describing the embodiments and is not intended to limit the present disclosure. In this specification, singular forms also include plural forms unless specifically stated otherwise in a phrase. As used herein, "comprises" and/or "comprising" does not exclude the presence or addition of one or more other elements other than the recited elements. Like reference numerals throughout the specification refer to like elements, and "and/or" includes each and every combination of one or more of the recited elements. Although "first", "second", and the like are used to describe various components, these components are not limited by these terms, of course. These terms are only used to distinguish one component from another. Accordingly, it goes without saying that the first element mentioned below may also be the second element within the technical spirit of the present disclosure.

Unless otherwise defined, all terms (including technical and scientific terms) used in this specification may be used with meanings commonly understood by those skilled in the art to which the present disclosure belongs. In addition, terms defined in commonly used dictionaries are not interpreted ideally or excessively unless explicitly specifically defined.

Hereinafter, embodiments of the present disclosure will be described in detail with reference to the accompanying drawings.

FIG. 1 is a schematic diagram of a system 10 for measuring a waste discharge amount and collecting waste according to one embodiment of the present disclosure.

Figure 2:
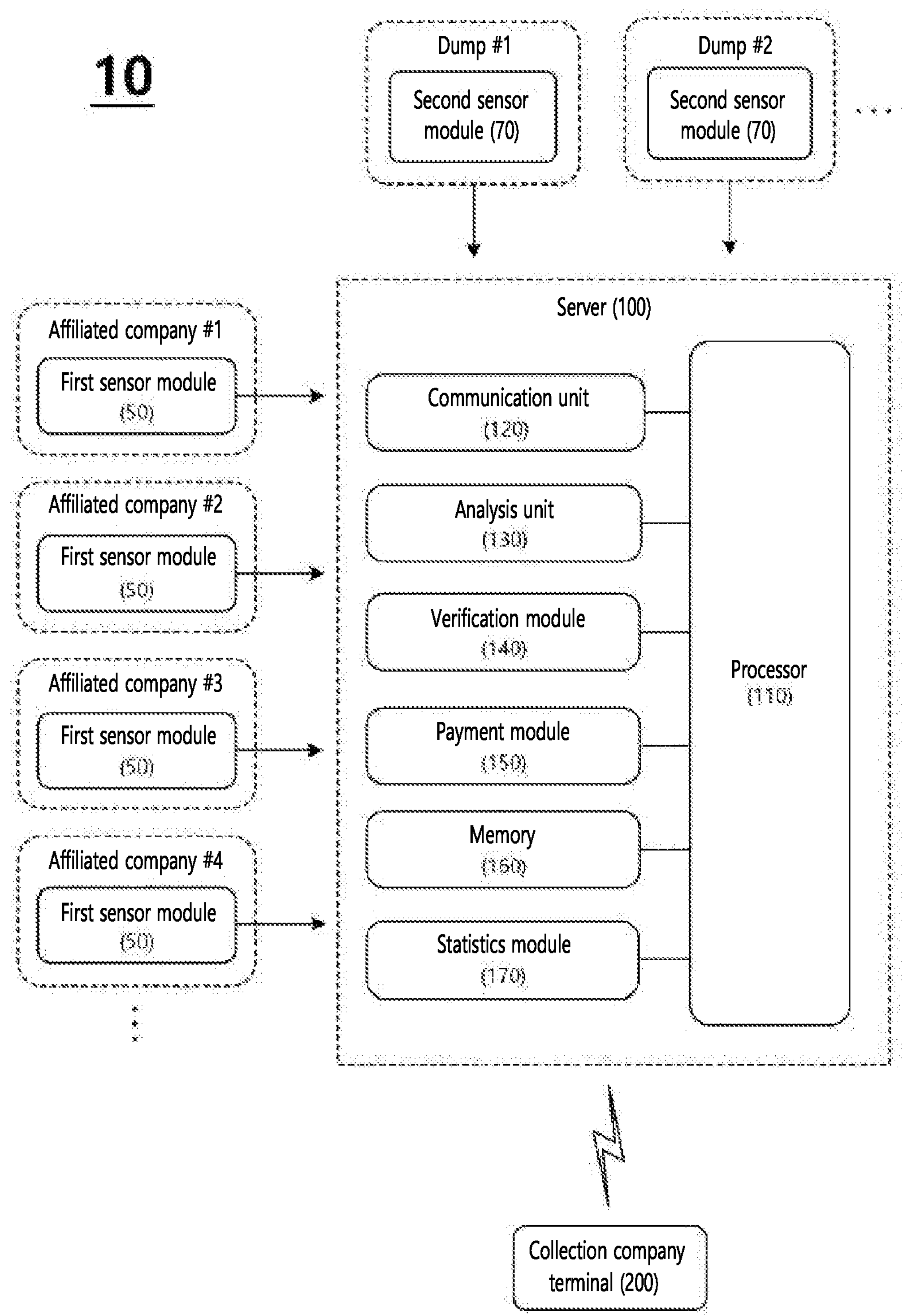
FIG. 2 is a block diagram of the system for measuring a waste discharge amount and collecting waste according to one embodiment of the present disclosure.

FIG. 2 is a block diagram of the system 10 for measuring a waste discharge amount and collecting waste according to one embodiment of the present disclosure.

Figure 3:
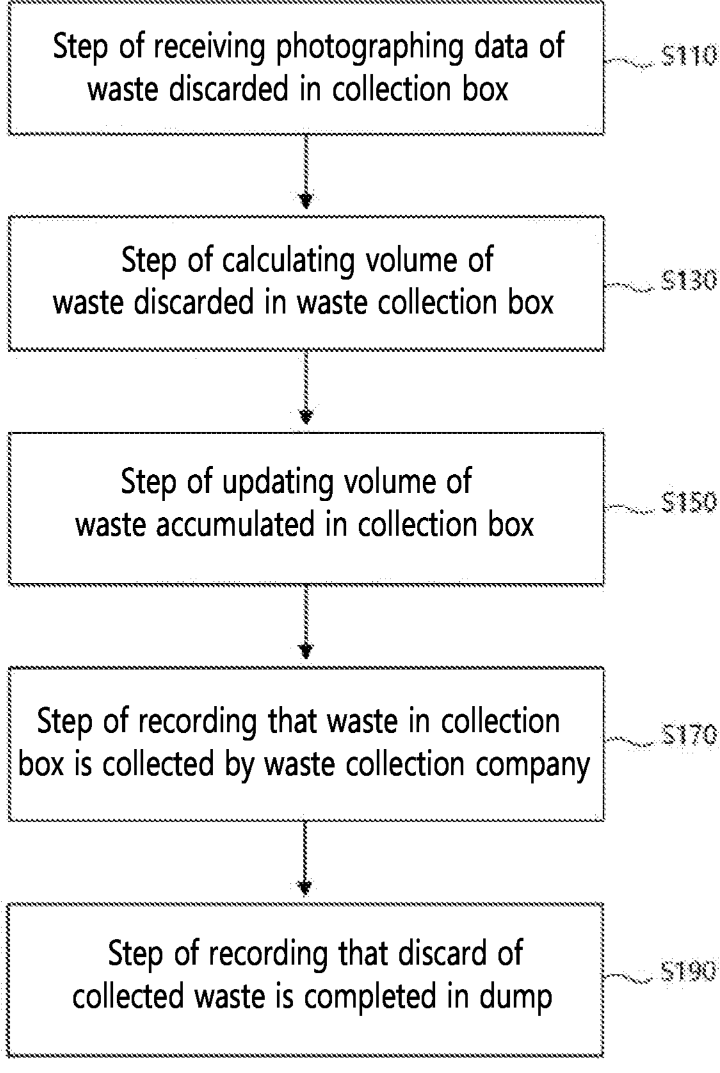
FIG. 3 is a flowchart of the system for measuring a waste discharge amount and collecting waste according to one embodiment of the present disclosure.

FIG. 3 is a flowchart of the system 10 for measuring a waste discharge amount and collecting waste according to one embodiment of the present disclosure.

FIGS. 4 to 7 are various exemplary diagrams for describing the system 10 for measuring a waste discharge amount and collecting waste according to one embodiment of the present disclosure.

Referring to FIGS. 1 to 7, a server 100 and a method for measuring a waste discharge amount and collecting waste according to one embodiment of the present disclosure will be described.

Referring to FIG. 2, the server 100 includes a processor 110, a communication unit 120, an analysis unit 130, a verification module 140, a payment module 150, a memory 160, and a statistics module 170. However, in some embodiments, the server 100 may include fewer or more components than those illustrated in FIG. 2.

In addition, in the embodiment of the present disclosure, an affiliated company using a service for measuring the waste discharge amount and managing waste collection provided by the server 100 is a company that generates waste, and typical examples may include restaurants, convenience stores, food service centers, hotels, residential areas, apartment complexes, enterprises, public institutions, military bases, schools, hospitals, factories, and the like.

The server 100 can provide a service application for the service for measuring the waste discharge amount and managing the waste collection, and a company that wants to use the service can register as an affiliated company by applying for an alliance through a web or service application, and a collection company that collects the waste can also apply for a collection partnership through the web or service application.

Since the server 100 receives photographing data taken from a plurality of first sensor modules 50 in real time, and updates, records, and posts the amount of waste accumulated in each waste collection box 20, the collection company may conduct collection bidding through the service application.

Here, the waste collection box 20 is a container having a volume to contain waste or food waste, and the volume may be calculated through an area of a horizontal section of the waste collection box 20 and a depth of a vertical section of the waste collection box 20.

In one embodiment of the present disclosure, the communication unit 120 may be in charge of all wired and wireless communications performed in the server such as receiving the photographing data taken from the first sensor module 50 installed in the affiliated company, receiving a discard measurement value from a second sensor module 70 installed in a dump, updating and posting various information in the server, and transmitting and receiving various request signals from an affiliated company terminal connected to the server 100. The affiliated company is where waste is generated and the dump is where the waste collected from the affiliated company is dumped.

Here, the photographing data generated by the first sensor module 50 may include image data and depth data, and the depth data is not limited as long as it is data for determining a volume of an object, such as distance data or 3D data.

The first sensor module 50 may include a plurality of devices capable of acquiring the image data and depth data, respectively, and in some embodiments, the first sensor module 50 may include a device capable of simultaneously acquiring image data and depth data, and in some embodiments, the first sensor module 50 includes a plurality of devices that acquire only image data, but depth data may be acquired through the acquired image data.

In one embodiment of the present disclosure, the processor 110 may be in charge of controlling all components such as the communication unit 120, the analysis unit 130, the verification module 140, the payment module 150, the memory 160, and the statistics module 170.

In addition, in the embodiment of the present disclosure, the first sensor module 50 for sensing the waste collection box 20 of the affiliated company may store an identification number, location information, affiliated company information, or the like to distinguish each other, and the information stored in the first sensor module 50 may be transmitted to the server 100.

In the embodiment of the present disclosure, the waste may be any waste as long as it can be discarded in the waste collection box 20, and food waste can be applied as a representative example.

First, the communication unit 120 of the server 100 receives photographing data of the waste discarded in the waste collection box 20 taken by at least one first sensor module 50 (S110).

In detail, the first sensor module 50 is installed in a location where at least one waste collection box 20 can be photographed, photographs waste discarded in the waste collection box 20, and transmits the taken photographing data to the server 100.

The first sensor module 50 is installed above or in an upper portion of the waste collection box 20 to photograph the waste collection box 20. For example, the first sensor module 50 may be spaced apart from the upper side of the waste collection box 20, and the first sensor module 50 may be installed on a ceiling. In some embodiments, the first sensor module 50 may be disposed above the waste collection box 20, and in some embodiments, when the waste collection box 20 has a cover (not illustrated), the first sensor module 50 may be disposed on the cover (not illustrated) of the waste collection box 20.

To implement the above operation, each first sensor module 50 includes a processor (not illustrated), a communication module (not illustrated), and a memory (not illustrated).

In addition, the first sensor module 50 may be installed in a location at which one waste collection box 20 can be photographed or a plurality of waste collection boxes 20 can be simultaneously photographed.

Therefore, one first sensor module 50 can photograph one or more waste collection boxes 20, and when the affiliated company is large and the amount of waste generated is large, a plurality of first sensor modules 50 may be installed in a garbage dump of the affiliated company.

In one embodiment, the first sensor module 50 may transmit all photographing data of the waste collection box 20 to the server 100.

However, the dumping of waste in the waste collection box 20 is an intermittent event. That is, in the case where the first sensor module 50 is always photographed and the photographed data is continuously provided to the server 100, the amount of data transmitted to the server 100 increases and the amount of data to be analyzed by the server 100 increases. Therefore, regular photographing may be inefficient, and as a result, overload of the server 100 may occur.

For this reason, in one embodiment, the first sensor module 50 detects a change in image data or depth data of the waste collection box 20 by a processor (not illustrated), and when there is a change in the volume or type of waste or food waste, the first sensor module 50 may transmit photographing information of the waste collection box 20 to the server 100.

In addition, in one embodiment, the first sensor module 50 may further include, as a configuration, a detection module (not illustrated) that detects whether a cover (not illustrated) of the waste collection box 20 is opened or detects a person approaching to throw away waste.

The first sensor module 50 detects whether the cover of the waste collection box 20 is opened or a person approaches the waste collection box 20 to throw away the waste through the detection module (not illustrated), may photograph the waste collection box (20) and transmit photographing data of the waste collection box (20) to the server 100.

In addition, the first sensor module 50 is configured to take the photographing and generate the photographing data. For example, the first sensor module 50 may include at least one of an RGB camera, a 2D camera, a 3D camera, a Time of Flight (ToF) camera, a light field camera, a stereo camera, an event camera, an infrared camera, and an ultrasonic sensor, and a configuration of the first sensor module 50 is not limited as long as it can measure image data and depth data as photographing data.

In some embodiments, the processor 110 may detect negative discard that may occur in the waste collection box 20.

For example, the processor 110 compares a photographing time of the photographing data with a business hour of the affiliated company when the waste is discarded in the waste collection box 20 and the photographing data is received, and when it is confirmed that the photographing time is outside the business hour of the affiliated company, this can be determined as the negative discard. Accordingly, the processor 110 may transmit an alarm of the negative discard to the terminal of the affiliated company together with the photographing data.

In some embodiments, a recognition module (not illustrated) capable of acquiring identification information on a person who discards the waste may be installed in the waste collection box 20 or the affiliated company. The recognition module (not illustrated) may be, for example, an RFID reader, a QR code scanner, or a user biometric information recognizer (such as a face recognizer or fingerprint recognizer). At this time, in a case where identification information is not acquired by the recognition module, the waste is discarded, and photographing data is received, the processor may determine this case as the negative discard. Accordingly, the processor 110 may transmit the alarm of the negative discard to the terminal of the affiliated company together with the photographing data.

Following S110, the processor 110 controls the analysis unit 130 to calculate the volume of waste discarded in the waste collection box 20 based on the photographing information received in S110 (S130).

Following S130, the processor 110 updates the volume of waste accumulated in the waste collection box 20 based on the waste volume calculated in S130 (S150).

Here, the processor 110 may update the volume of waste accumulated in the waste collection box 20 whenever waste is discarded in the waste collection box 20. That is, the processor 110 may update the volume of waste accumulated in the waste collection box 20 when the waste is discarded in the waste collection box 20 and there is a change in volume in the waste collection box 20.

In some embodiments, the processor 110 may update the volume of waste accumulated in the waste collection box 20 at a predetermined time regardless of the change in the volume in the waste collection box 20. For example, at a predetermined time, the processor 110 may update the volume of waste accumulated in the waste collection box 20 at predetermined intervals, but the processor 110 may not update the volume of waste accumulated in the waste collection box 20 repeatedly at regular intervals. That is, the appropriate photographing time of the first sensor module 50 is determined by a predetermined algorithm, and accordingly, the processor 110 may update the volume of waste accumulated in the waste collection box 20, and the processor 110 may continuously update the volume of waste accumulated in the waste collection box 20 without a regular cycle.

In the embodiment of the present disclosure, an image recognition algorithm is stored in the memory 160 so that the analysis unit 130 analyzes the photographing data that is photographed and received from the first sensor module 50 and recognizes the waste in the image data, and in order to calculate the volume of the waste by analyzing the depth data of the recognized waste, a volume calculation algorithm is stored in the memory 160.

Accordingly, the processor 110 controls the analysis unit 130 to determine the type of waste discarded in the waste collection box 20 based on the photographing data received from the first sensor module 50. For example, in the case of food waste, the processor 110 may determine the type of discarded food. Specifically, in the process of determining the type of food, the processor 110 may determine the type of food of each food image data extracted from image data using a model learned using an artificial intelligence algorithm.

Here, a density value of waste or food waste previously stored in the memory 160 may be obtained by determining the type of discarded waste or the type of discarded food by the analysis unit 130. In addition, the analysis unit 130 may derive the weight (mass) of waste through the calculated volume of waste and the obtained density value of waste.

For the above configuration, raw data of the waste collection box 20 owned by the affiliated company may be stored in the memory 160 of the server 100. Here, the raw data of the waste collection box 20 may be numerical data of the empty waste collection box 20, and the system 10 for measuring the waste discharge amount and managing the waste collection according to the present embodiment calculates the volume of food waste using the depth data included in the photographing data, and requires numerical data of the empty waste collection box 20 in the volume calculation process.

At this time, the raw data of the waste collection box 20 may include capacity information or size information of the waste collection box 20, and the size information may include size information or width information of the cross section of the waste collection box 20, and depth information of the waste collection box 20. The raw data of the waste collection box 20 may be calculated and stored based on photographing data measured by the first sensor module 50 in a state in which the waste collection box 20 is empty.

In some embodiments, the raw data of the waste collection box 20 may be input from the terminal of an affiliated company.

In one embodiment, when there is a request of the affiliated company, the server 100 requests the waste collection box 20 owned by the affiliated company to be photographed in a state where the waste collection box 20 is empty using the first sensor module 50 and receives the photographing data photographed by the first sensor module 50.

Then, the processor 110 may control the analysis unit 130 to analyze the photographing data photographed and received from the first sensor module 50, calculate the capacity information or size information of the waste collection box 20 possessed by the affiliated company, and store the calculated information in the memory 160 to use the information.

The processor 110 may recognize a situation in which there is no waste in the waste collection box 20 by analyzing the image data included in the photographing data through the analysis unit 130, and at this time, calculate the depth information of the waste collection box 20 through the depth data, and calculate the size information of the cross section of the waste collection box 20 through image data to generate the raw data.

Therefore, according to the system 10 for measuring the waste discharge amount and managing the waste collection of the present embodiment, since the raw data of the empty waste collection box 20 can be measured by the first sensor module 50 for any waste collection box 20, there is no restriction on the waste collection box 20 used.

In one embodiment, the processor 110 may analyze the image of the waste collection box 20 piled up in the waste collection box 20 in the photographed image received from the first sensor module 50, and in detail, the processor 110 may determine the type of waste using the image data of the waste and calculate the volume of the waste based on the raw data of the waste collection box 20 and height information of the accumulated waste in the waste collection box In one embodiment, the processor 110 may determine the type of waste determined through the analysis unit 130 and calculate the volume and weight of the waste discarded in the waste collection box 20 based on the depth data measured from the first sensor module 50. Here, a cross-sectional area of the waste collection box 20 can be known through the raw data of the waste collection box 20, and the depth of the waste collection box 20 can be known through the raw data of the waste collection box 20. Moreover, the volume of the waste can be calculated by further using the depth data measured from the first sensor module 50, and the weight of the waste can be calculated by further using the density value of the waste.

That is, when the processor 110 determines the type of waste using the artificial intelligence module, the weight (mass) of the waste in the waste collection box 20 is calculated based on the calculated volume value and the density value of the corresponding waste stored in the memory 160.

For such a configuration, a mass value per volume and a weight value per volume may be stored as density values according to the type of waste in the memory 160 of the server 100.

In addition, in order to calculate a fee to be described below, a fee calculation method for each type and weight of waste may be stored.

According to the present embodiment, it is possible to check in real time how much waste fills the waste collection box 20 by monitoring the volume of the waste collection box 20 through the first sensor module 50, and it is possible to calculate the waste collection cost without using a weight sensor by calculating the weight of the waste through the volume measured by the first sensor module 50. Moreover, since the raw data can be obtained from any waste collection box 20 using the first sensor module 50, there is no restriction on the waste collection box 20 used.

Figure 4:
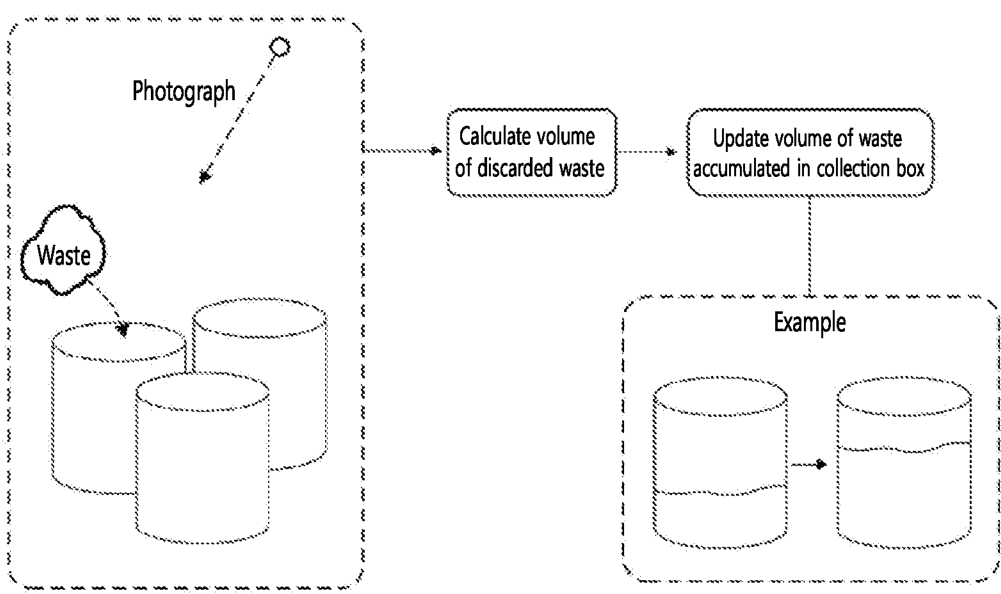
FIG. 4 is a diagram illustrating that a calculation unit calculates a volume of waste discarded in a waste collection box, and updates and manages the volume accumulated in the collection box.

FIG. 4 is a diagram illustrating that the analysis unit 130 calculates the volume of waste discarded in the waste collection box 20, and updates and manages the volume accumulated in the collection box.

Referring to FIG. 4, when the first sensor module 50 recognizes that waste is thrown away in the waste collection box 20, the sensor module 50 photographs this and transmits the photographing data to the server 100, and when photographing data is received, the processor 110 of the server 100 controls the analysis unit 130 to recognize waste image data in the photographing data, and then calculates the volume of the recognized waste image data.

The analysis unit 130 may perform correction to increase accuracy of the volume calculation in the process of calculating the volume of waste. For example, the analysis unit 130 may perform tilt correction on photographing data. That is, when the photographing is performed by the first sensor modular 50 in a state where the waste collection box 20 is tilted or shaken, the analysis unit 130 recognizes the shake or tilt of the image, selects the image data having the least change in shake or tilt, and corrects it with the image data in a horizontal state so that the volume of waste can be accurately calculated.

Moreover, the analysis unit 130 may perform correction by excluding noise values in the photographing data. For example, since the volume of waste may be incorrectly calculated by a person's hand or cover (not illustrated) during the photographing process, the analysis unit 130 analyzes the photographing data and may perform noise removal correction to exclude the persons' hand or cover (not illustrated) recognized as non-food waste.

In addition, the analysis unit 130 may recognize and correct an error due to light reflection or the like with respect to liquid food waste.

Then, the processor 110 updates the volume of waste accumulated in the corresponding waste collection box 20 based on the calculated result.

In this way, the reason for calculating the volume of waste discarded in the collection box and updating the volume of waste accumulated in the waste collection box 20 is to manage the collection company to collect before the amount of waste accumulated in the waste collection box 20 owned by the affiliated company exceeds the capacity of the waste collection box 20.

FIG. 5 is a diagram illustrating that the processor 110 posts the volume status of the waste collection box 20 and receives a collection bid from a collection company.

The processor 110 updates the volume of waste accumulated in the collection box as in S150 and posts the updated volume to the server 100 to provide corresponding information to the waste collection company terminal 200 connected to the server 100. If necessary, the server 100 may provide various information to an affiliated company terminal (not illustrated) connected to the server 100.

Moreover, the collection company can bid on the waste collection by accessing the server 100 through the terminal 200 and clicking a collection bidding button requesting to collect the waste collection box 20 of the specified affiliated company as illustrated in FIG. 5.

In one embodiment, the first sensor module 50 may be installed in a location capable of photographing the inside of the waste collection box 20, and the first sensor module 50 may photograph waste discarded to the waste collection box 20, as well as photograph accumulated waste in the waste collection box 20 and transmit it to the server 100.

The server 100 may analyze the image of the waste collection box 20 photographed and received from the first sensor module 50 based on artificial intelligence, recognize the waste collection box 20 in the photographing data, and calculate the volume of the waste accumulated in the waste collection box 20.

Therefore, the server 100 for measuring the waste discharge amount and managing the waste collection according to one embodiment of the present disclosure monitors can calculate the cost burden according to waste discharge and the compensation amount of the collection company without separate work, as well as monitor the amount (volume, weight) of the waste accumulated in the waste collection box 20.

In some embodiments, the processor 110 may make a collection request to the collection company based on the amount of discard accumulated and measured so far in the waste collection box 20 of the affiliated company so that collection by the collection company can proceed before the capacity of the waste collection box 20 is exceeded.

Specifically, the processor 110 calculates the expected amount of waste discard per hour at the corresponding time based on the amount of waste generated by the day of the week of the affiliated company calculated by the statistical module 170 to be described later, so that a time when the capacity of the waste collection box 20 is full can be predicted. In addition, the processor 110 may request collection in advance to the collection company before the waste exceeds the capacity of the waste collection box 20.

Following S150, when the collection signal of the waste collection box 20 is received from the terminal 200 of the specified waste collection company, the processor 110 records in the memory 160 that the waste of the corresponding collection box is collected by the waste collection company (S170).

In one embodiment of the present disclosure, as illustrated in FIG. 1, a tag for identifying the waste collection box 20 may be formed in the waste collection box 20 installed in the affiliated company.

Accordingly, the waste collection company accesses the server 100 through the terminal 200. Thereafter, after the waste collection company bids to collect the waste of the specified affiliated company, when the bid is permitted and the tag of the waste collection box 20 of the corresponding affiliated company is recognized through the terminal 200, the processor 110 of the server 100 may determine that the waste of the affiliated company has been collected by the corresponding collection company, and record it in the memory 160.

That is, when the collection company visits the affiliated company and recognizes the tag of the collection box through the terminal 200, the processor 110 of the server 100 determines that the waste of the corresponding waste collection box 20 has been collected by the corresponding collection company, and records the weight of the corresponding waste collection box 20 at the time when the tag is recognized as the collection weight of the corresponding collection company.

Meanwhile, it is also possible to specify the collection company separately or at the same time as specifying the waste collection box 20 through the tag. To this end, a recognition module (not illustrated) capable of acquiring identification information of the collection company may be installed in the waste collection box 20 or the affiliated company. The recognition module (not illustrated) may be, for example, an RFID reader, a QR code scanner, or a user biometric information recognizer (such as a face recognizer or a fingerprint recognizer), and it is possible to specify the collection company that collects the waste collection box 20 through RFID tagging, QR code scanning, mobile tagging, user biometric information recognition, and the like of the collection company or the collection company employee. At this time, the server 100 can determine that the waste of the waste collection box 20 whose volume has decreased before and after the recognition module (not illustrated) recognizes the collection company identification information has been collected by the corresponding collection company.

As the method in which the server 100 receives the collection signal of the waste collection box 20, in addition to the above method, various methods as follows may be applied.

① When the tag formed in the waste collection box 20 or the tag formed in the specified location in the garbage dump of the affiliated company is photographed and received from the collection company terminal 200, the server 100 may determine that the collection signal of the waste collection box 20 of the affiliated company has been received.

② When the specified collection company bids on the waste collection of the specified affiliated company, and after the bid is permitted, the GPS information of the collection company terminal 200 approaches the location information of the affiliated company within the preset distance, the server 100 may determine that the collection signal of the waste collection box 20 of the affiliated company has been received.

In addition, as described above, various recognition methods may be applied to the waste collection box 20, such as a method in which an RFID tag is formed or a QR code is formed.

Recognizing waste collection by the server 100 can be applied in various ways other than the above examples, so that the practitioner of the disclosure can easily select the method.

Figure 6:
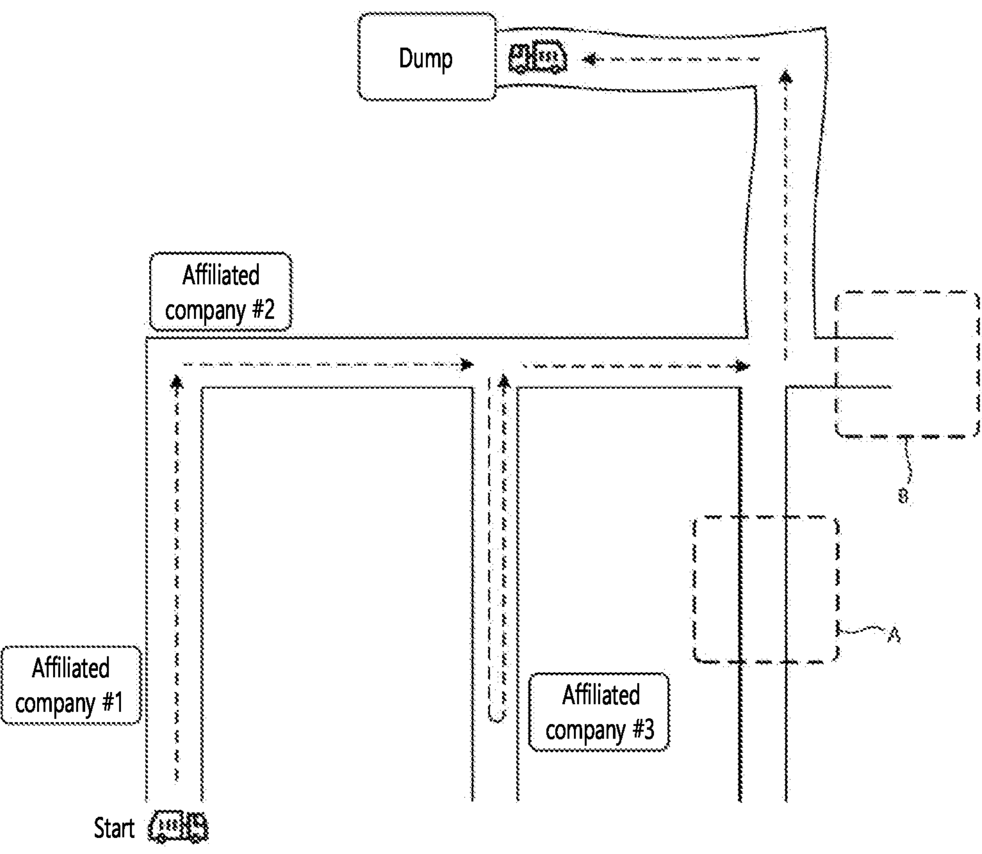
FIG. 6 is a diagram illustrating that a vehicle of a collection company moves to a dump after collecting waste of affiliated companies contracted for waste collection while moving along a movement path.

FIG. 6 is a diagram illustrating that a vehicle of a collection company moves to a dump after collecting waste of affiliated companies contracted for waste collection while moving along a movement path.

Referring to FIG. 6, the processor 110 of the server 100 acquires GPS information of the corresponding collection company terminal 200 from the time when the collection signal is received, and tracks the location of the corresponding collection company terminal 200 until receiving a discard completion signal using the acquired GPS information.

In addition, when the discard completion signal is received from the terminal 200 of the collection company that has collected the waste in the collection box, it is recorded in the memory 160 that the discard of the waste of the corresponding affiliated company in the dump is completed.

In one embodiment, based on the location information of at least one waste collection box 20 scheduled for collection by the collection company and the location information of the dump scheduled to discard the waste collected by the collection company, the processor 110 generates a movement path information of the collection company terminal 200.

Moreover, when the collection company terminal 200 is out of a preset range in the movement path information, the collection company terminal 200 is turned off, or a GPS function of the collection company terminal 200 is turned off while the location of the collection company terminal 200 is tracked, the processor 110 records location information of the collection company terminal 200 and time information at the corresponding time point and provides warning to the collection company terminal 200.

In this embodiment, tracking the location information of the collection company terminal 200 means tracking the location of the waste collection vehicle of the collection company.

Referring to FIG. 6, for example, when the location information of the collection company terminal 200 is a specified location that is out of the predetermined location information, such as area A or area B, The processor 110 determines that there is a possibility that the corresponding collection company will discard the waste in an arbitrary place, records the location information and time information of the collection company terminal 200 at that time, and provides a warning to the collection company terminal 200.

In some embodiments, the processor 110 may derive an optimal traffic line based on a list of affiliated companies to be collected by the collection company and location information of a dump to be discarded, and provide the optimal traffic line to the collection company terminal 200.

In one embodiment, the processor 110 combines the weight of waste in the waste collection box 20 of the affiliated company collected from the collection company and records the combined weight as the total amount of collection.

Then, when the processor 110 receives the discard measurement value including the volume or weight of the waste discarded by the corresponding collection company from the second sensor module 70 installed in the dump and sensing the discarded waste, the processor 110 measures an error by comparing the total amount of collection collected from the affiliated company with the discard measurement value discarded in the dump.

In one embodiment of the present disclosure, the first sensor module 50 that senses the waste collection box 20 of the affiliated company and the second sensor module 70 that is installed in the dump and senses the discarded waste can perform the same function.

However, the present disclosure is not limited thereto, and the second sensor module 70 installed in the dump may be applied with a weight sensor for measuring the weight of discarded waste. However, when the second sensor module 70 is the same as the first sensor module 50, the type of waste discarded through the second sensor module 70 can also be confirmed. Therefore, at this time, it is possible to compare not only the total amount of collection collected from the affiliated company and the discard measurement value discarded to the dump, but also whether the type of waste discarded is the same.

The processor 110 generates a discard completion signal when the calculated error, which is the difference between the weight of the collected waste and the weight of the discarded waste, falls within a preset error range.

In addition, when the calculated error exceeds the preset error range, the processor 110 calculates possible reduction according to waste transportation based on the movement path information up to the dump of the collection company terminal 200 and the type of waste collected by the collection company.

Then, the processor 110 determines justification of occurrence of the error based on the calculated possible reduction.

For example, in the case of waste containing a lot of moisture, since the weight may be slightly reduced during the transportation process, the processor 110 verifies whether the corresponding error can correspond to this based on the calculated error.

In one embodiment of the present disclosure, a justification determination algorithm capable of determining the justification of occurrence of the error is stored in the verification module 140.

Accordingly, when the error measurement is completed, the processor 110 loads the justification determination algorithm through the verification module 140 and determines the justification of occurrence for the error.

Then, the processor 110 generates a discard completion signal when the justification of occurrence of the error is verified.

Following S170, when the processor 110 receives he discard completion signal from the terminal 200 or dump of the collection company that has collected the waste in the collection box, the processor 110 records in the memory 160 that the discard of the waste of the affiliated company/collection box has been completed in the dump (S190).

FIG. 7 is a diagram illustrating that the payment module 150 calculates the cost burden of the affiliated company and the collection compensation amount of the collection company based on the type and weight of the waste.

Referring to FIG. 7, the server for measuring the waste discharge amount and managing the waste collection according to one embodiment of the present disclosure may provide services for calculating a cost burden, a compensation amount, and the like, in addition to managing waste collection.

More specifically, the server 100 further includes the payment module 150 that calculates a compensation amount according to the cost burden of the affiliated company and the waste collection/discard of the collection company according to the type and amount of waste.

The processor 110 controls the payment module 150 to calculate the cost burden of the affiliated company and the compensation amount of the collection company according to the type and amount (weight) of the waste. The processor 110 identifies a characteristic value of the affiliated company by using location information of the waste collection box 20 located in the affiliated company, and determines the type of discarded waste using the identified characteristic value of the affiliated company. Affiliated company such as restaurants, convenience stores, food service centers, hotels, residential areas, apartment complexes, corporations, public institutions, military bases, schools, hospitals, and factories may each have different types of waste.

In detail, the processor 110 calculates the compensation amount of the collection company based on the total amount (weight) of waste collected and discarded by the collection company, and in some embodiments, the processor 110 may calculate the compensation amount of the collection company by further considering additional factors such as the location information of the collection company, the distance information to the dump, and the like.

The server 100 for measuring the waste discharge amount and managing the waste collection according to one embodiment of the present disclosure may provide the waste discharge amount measurement and collection management service to the affiliated company and collection company, calculate the cost burden according to the waste discharge of the affiliated company through the payment module 150 as described above, and calculate the compensation amount according to the waste collection/discard of the collection company. Moreover, in some embodiments, the affiliated company may pay the cost burden and pay the compensation amount to the collection company through the service.

In one embodiment, the processor 110 provides the information on the volume of the waste accumulated in at least one waste collection box 20 of at least one affiliated company affiliated with the server 100 to the terminal 200 of the waste collection company connected to the server 100.

In addition, the processor 110 calculates the expected collection time of the waste collection box 20 of the affiliated company based on the current location information and collection route information of at least one collection company that has bid for the waste collection of the specified affiliated company, performs examination based on the calculated expected collection time and the waste volume accumulated in the waste collection box 20 of the affiliated company, and selects one collection company from among the collection companies that bid to provide the collection right of the waste collection box 20 to the corresponding affiliated company.

For example, when the waste capacity accumulated in the waste collection box 20 of the specify affiliated company is expected to exceed the capacity of the waste collection box 20 within a short period of time, there is a need to select a collection company that can collect the waste collection box 20 of the affiliated company in a short time.

Through the above configuration, the server 100 not only mediates waste collection, but also has an effect of preventing excess in the capacity of the waste collection box 20 of the affiliated company and contamination of the waste collection field in advance.

As one embodiment, the server 100 may further include the statistics module 170.

The statistics module 170 may sort data according to the status of waste generation by affiliated company, by waste collection box 20, by time, by day, by week, by month, by year, or the like, and may generate visual information (for example: graphs, or the like) based on the sorted data.

For example, when the user selects a specified area through the application, the amount of waste generated in the area is displayed as a numerical value or graph, and it is possible to provide status information on the value of goods and the current status of waste in the area.

For example, the status information may include information such as whether too much waste is generated, such as bad, good, or pleasant, or whether the amount of waste is decreasing.

Therefore, the user can monitor the amount of waste generated, analyze the data and the cause, and find a way to reduce the amount of waste generated.

In particular, since the statistical module 170 continuously collects and analyzes data on the type and amount of waste, when the waste is food waste, information on preferred food, non-preferred food, and leftovers can be created and reflected in the process of cooking in the affiliated company.

In addition, the statistics module 170 can generate average waste amount and waste collection schedule information for each affiliated company based on the capacity of the waste collection box 20 of the affiliated company and the daily average waste discard amount, and the waste collection schedule information of the waste collection company in a certain area may be generated, and such information may be provided to a terminal of a necessary affiliated company.

In addition, the statistics module 170 may provide feedback on each menu by analyzing discard information of the affiliated company. For example, as a result of analyzing the discard information, when the leftover amount of the specified food included in the specified menu is relatively large, the statistical module 170 may provide a feedback related to reduction in the amount of the food included in the menu or replacement of the food with another type of food to the terminal of the affiliated company.

Here, the discard information may include information on the type and amount (volume or weight) of food included in the waste.

Moreover, the statistical module 170 may analyze the discard information to calculate food preference analysis information for a customer. Accordingly, even when a separate survey is not conducted from the customer, it is possible to know a customer's satisfaction with the menu with only the discard information. Therefore, when the affiliated company improves a taste in menu or develops a new menu, it can provide objective customer response information.

In addition, the statistical module 170 can automatically adjust the amount of food provided to the customer using the discard information, and through this, it is possible to control the discard amount of the affiliated company while checking the current status of food waste generation in real time.

In addition, sales management is possible using the statistics module 170, and the operation of the affiliated company can be automated based on data through sales and order information, such as automatically ordering raw materials in consideration of the remaining food ingredients in kitchen of the affiliated company. For example, the statistics module 170 not only automatically orders raw materials based on the discard information, but also guides the appropriate order amount when there is an excessively ordered raw material according to the discard information, and thus, I tis possible to automate the operation of the affiliated company based on data.

Therefore, the server for measuring the waste discharge amount and managing the waste collection according to one embodiment of the present disclosure can measure the discharge amount of waste by measuring the amount of waste discarded in the collection box in real time using the sensor provided in each collection box. Accordingly, all information such as information on the time when the collection of the waste collection box 20 is requested, the collected capacity and weight, a trade name of the collection company that collects the collection box, and the collection time, information on the route the collection company moves after collecting the waste, information on the dump of collected waste, information on the discarded amount may be measured, recorded, and tracked.

A method according to one embodiment of the present disclosure described above may be implemented as a program (or application) to be executed in combination with the server, which is hardware, and stored in a medium.

In order for the computer to read the program and execute the methods implemented in the program, the program may include a code coded in a computer language such as C, C++, JAVA, or machine language that can be read by a processor (CPU) of the computer through a device interface of the computer. The code may include functional codes related to functions defining necessary functions for executing the methods, and include execution procedure-related control codes necessary for the processor of the computer to execute the functions according to a predetermined procedure. In addition, the code may further include memory reference related codes for which location (address address) of the computer's internal or external memory should be referenced for additional information or media required for the processor of the computer to execute the functions. When the processor of the computer needs to communicate with any other remote computer or server in order to execute the functions, the code may further include communication-related codes for how to communicate with any other remote computer or server using the communication module of the computer, and what information or media should be transmitted/received during communication.

The storage medium is not a medium that stores data for a short moment, such as a register, cache, or memory, but a medium that stores data semi-permanently and is readable by a device. Specifically, examples of the storage medium include a ROM, a RAM, a CD-ROM, a magnetic tape, a floppy disk, an optical data storage device, or the like, but are not limited thereto. That is, the program may be stored in various recording media on various servers accessible by the computer or various recording media on the computer of the user. In addition, the medium may be distributed to computer systems connected through a network, and computer readable codes may be stored in a distributed manner.

Steps of a method or algorithm described in connection with one embodiment of the present disclosure may be implemented directly in hardware, implemented in a software module executed by hardware, or implemented by a combination thereof. A software module may reside in a random access memory (RAM), a read only memory (ROM), an erasable programmable ROM (EPROM), an electrically erasable programmable ROM (EEPROM), a flash memory, a hard disk, a removable disk, a CD-ROM, or any form of computer readable recording medium well known in the art to which the present disclosure pertains.

Although the embodiments of the present disclosure have been described with reference to the accompanying drawings, those skilled in the art to which the present invention pertains will understand that the present invention may be embodied in other specific forms without changing its technical spirit or essential features. Therefore, it should be understood that the embodiments described above are illustrative in all respects and not restrictive.

REFERENCE SIGNS LIST

10: system for measuring waste discharge amount and managing waste collection
50: first sensor
70: second sensor
100: server
110: processor
120: communication unit
130: analysis unit
140: verification module
150: payment module
160: memory
170: statistics module
200: collection company terminal

The invention claimed is:

1. A server for measuring a waste discharge amount and managing waste collection, the server comprising:

a communication unit that receives photographing data taken by a first sensor installed in a location for photographing at least one waste collection box to photograph waste discarded in the waste collection box; and a processor that calculates a volume of the waste discarded in the waste collection box based on the received photographing data, updates the volume of waste accumulated in the waste collection box based on the calculated waste volume, and records in a memory that the waste in the collection box is collected by a waste collection company when a signal for collecting the waste collection box by the waste collection company is received, wherein the processor determines a type of the waste discarded in the waste collection box based on the image data included in the received photographing data and calculates a volume and weight of the waste discarded in the waste collection box based on the determined waste type and depth data included in the received photographing data, wherein the processor acquires GPS information of a collection company terminal of the collection company from a time when the collection signal is received and tracks the location of the collection company terminal until receiving the discard completion signal from the collection company terminal using the acquired GPS information, and records in a memory that the discard of the waste of the affiliated company is completed in a dump when the discard completion signal is received from the terminal of the collection company collecting the waste of the collection box, wherein the processor combines weight of waste in the waste collection box collected from the collection company and records the combined weight as a total amount of collection, and compares the total amount of collection and a discard measurement value to measure an error when receiving the discard measurement value including the weight of the waste discarded by the collection company from a second sensor which is installed in the dump to sense the discarded waste.

2. The server of claim 1, wherein, when the type of waste discarded in the waste collection box is determined, the processor calculates the weight of the waste in the waste collection box based on the calculated volume value and the previously stored density value of the corresponding waste.

3. The server of claim 1, wherein the processor specifies the collection company that collects the waste collection box based on identification information of the collection company received in a process of collecting the waste collection box.

4. The server of claim 1, wherein when the error exceeds a preset error range, the processor:

calculates possible reduction according to waste transport based on movement path information from the collection company terminal to the dump and the type of waste collected by the collection company, and determines justification of occurrence of the error based on the possible reduction.

5. The server of claim 4, further comprising:

a payment module for calculating a cost burden of the affiliated company and a compensation amount of the collection company according to the type and amount of the waste, wherein, when the justification of the error occurrence passes, the processor controls the payment module to calculate the cost burden of the affiliated company and the compensation amount of the collection company based on the type and weight of the waste.

6. The server of claim 1, wherein:

the processor generates movement path information of the collection company terminal based on location information of at least one waste collection box scheduled to be collected by the collection company and location information of the dump in which the waste collected by the collection company is scheduled to be discarded, and when the terminal of the collection company is out of a preset range in the movement path:

the collection company terminal is turned off, or a GPS function of the collection company terminal is turned off while the location of the collection company terminal is tracked, and the processor records location information of the collection company terminal and time information at the corresponding time point and provides warning to the collection company terminal.

7. A server for measuring a waste discharge amount and managing waste collection, the server comprising:

a communication unit that receives photographing data taken by a first sensor installed in a location for photographing at least one waste collection box to photograph waste discarded in the waste collection box; and a processor that calculates a volume of the waste discarded in the waste collection box based on the received photographing data, updates the volume of waste accumulated in the waste collection box based on the calculated waste volume, and records in a memory that the waste in the collection box is collected by a waste collection company when a signal for collecting the waste collection box by the waste collection company is received, wherein the processor determines a type of the waste discarded in the waste collection box based on the image data included in the received photographing data, and calculates a volume and weight of the waste discarded in the waste collection box based on the determined waste type and depth data included in the received photographing data, wherein the processor:

provides information on a waste volume accumulated in at least one waste collection box assigned to the at least one affiliated company to the terminal of the waste collection company connected to the server, calculates an expected collection time of the waste collection box of the specified affiliated company based on current location information and collection route information of at least one collection company that bids on the waste collection of the specified affiliated company, examines based on the calculated expected collection time and the waste volume accumulated in the waste collection box to select one collection company among the collection companies that made the bid, and then provides a collection right of the waste collection box to the selected collection company.

8. The server of claim 1, wherein updating the volume of the waste accumulated in the waste collection box is executed every time the waste in the waste collection box is discarded or at a fixed time point.

9. A method for measuring a waste discharge amount and managing waste collection executed by a computer, the method comprising:

receiving photographing data taken by a first sensor installed in a location for photographing at least one waste collection box to photograph waste discarded in the waste collection box;

calculating a volume of the waste discarded in the waste collection box based on the received photographing data;

updating the volume of waste accumulated in the waste collection box based on the calculated waste volume; and recording in a memory that the waste in the collection box is collected by a specified waste collection company when a collection signal of the waste collection box is received from a terminal of the specified waste collection company, wherein the calculating the volume of the waste determines a type of the waste discarded in the waste collection box based on the image data included in the received photographing data, and calculates a volume and weight of the waste discarded in the waste collection box based on the determined waste type and depth data included in the received photographing data, wherein the computer:

acquires GPS information of a collection company terminal of the collection company from a time when the collection signal is received and tracks the location of the collection company terminal until receiving the discard completion signal from the collection company terminal using the acquired GPS information, records in a memory that the discard of the waste of the affiliated company is completed in a dump when the discard completion signal is received from the terminal of the collection company collecting the waste of the collection box, combines weight of waste in the waste collection box collected from the collection company and records the combined weight as a total amount of collection, and compares the total amount of collection and a discard measurement value to measure an error when receiving the discard measurement value including the weight of the waste discarded by the collection company from a second sensor which is installed in the dump to sense the discarded waste.

10. The method of claim 9, wherein, when the error exceeds a preset error range, the computer:

calculates possible reduction according to waste transport based on movement path information from the collection company terminal to the dump and the type of waste collected by the collection company, and determines justification of occurrence of the error based on the possible reduction.

11. A non-transitory computer-readable recording medium in which a program for executing the method of claim 9 is stored in combination with a computer which is hardware.

12. The server of claim 1, wherein:

raw data of the waste collection box includes capacity information or size information of the waste collection box, and the size information includes size information or width information of the cross section of the waste collection box, and depth information of the waste collection box.

13. The server of claim 1, wherein the processor:

checks the characteristic value of a company where the waste collection box exists by using the location information of the waste collection box, and determines the type of discarded garbage using the checked characteristic value of the company.

14. The server of claim 1, wherein the processor:

identifies a characteristic value of the affiliated company by using location information of the waste collection box located in the affiliated company, and determines the type of discarded waste using the identified characteristic value of the affiliated company.

* * * * *